(12) United States Patent
Yamamoto (10) Patent No.: US 6,661,755 B2
(45) Date of Patent: Dec. 9, 2003

(54) OPTICAL DISC APPARATUS

(75) Inventor: Kazutaka Yamamoto, Kanagawa-ken (JP)

(73) Assignee: Ricoh Company, Ltd. (JP)

( * ) Notice: Subject to any disclaimer, the term of this patent is extended or adjusted under 35 U.S.C. 154(b) by 0 days.

(21) Appl. No.: 10/199,042

(22) Filed: Jul. 22, 2002

(65) Prior Publication Data

US 2002/0176336 A1 Nov. 28, 2002

Related U.S. Application Data

(63) Continuation of application No. 10/082,345, filed on Feb. 26, 2002, which is a continuation of application No. 09/741,900, filed on Dec. 22, 2000, now Pat. No. 6,418,099, which is a continuation of application No. 08/906,290, filed on Aug. 5, 1997, now Pat. No. 6,198,707.

(30) Foreign Application Priority Data

Aug. 6, 1996 (JP) .............................................. 8-206705

(51) Int. Cl.[7] ................................................. G11B 7/00
(52) U.S. Cl. ................................................... 369/47.33
(58) Field of Search ........................ 369/47.33, 47.34, 369/47.32, 47.51

(56) References Cited

U.S. PATENT DOCUMENTS

| | | |
|---|---|---|
| 4,583,211 A | 4/1986 | Nishikawa et al. |
| 4,713,802 A | 12/1987 | Kobata et al. |
| 4,727,530 A | 2/1988 | Tomisawa |
| 4,982,110 A | 1/1991 | Yokogawa et al. |
| 5,212,678 A | 5/1993 | Roth et al. |
| 5,323,367 A | 6/1994 | Tamura et al. |
| 5,337,295 A | 8/1994 | Maeda |
| 5,343,455 A | 8/1994 | Takeuchi et al. |
| 5,363,362 A | 11/1994 | Maeda et al. |
| 5,418,762 A | 5/1995 | Kitayama |
| 5,432,769 A | 7/1995 | Honjo |

(List continued on next page.)

FOREIGN PATENT DOCUMENTS

| | | |
|---|---|---|
| JP | 63-52393 | 3/1988 |
| JP | 3-260958 | 11/1991 |
| JP | 4-247325 | 9/1992 |
| JP | 5-159445 | 6/1993 |
| JP | 6-44687 | 2/1994 |
| JP | 7-296507 | 11/1995 |
| JP | 8-147878 | 6/1996 |
| JP | 8-147879 | 6/1996 |
| JP | 9-45006 | 2/1997 |
| JP | 9-167443 | 6/1997 |

OTHER PUBLICATIONS

US 5,455,812, 10/1995, Shinada (withdrawn)

Primary Examiner—Nabil Hindi
(74) Attorney, Agent, or Firm—Dickstein Shapiro Morin & Oshinsky LLP (57) ABSTRACT

An optical disc apparatus includes a pause circuit for pausing data encoders upon receiving a pause signal so that a write operation may be paused without writing dummy data, thereby maintaining data succession. The optical disc apparatus also includes a circuit for accurately determining a write start location by referring to previously written data. A processor generates a pause signal when the amount of data in the optical drive apparatus data buffer is low, and removes the pause signal when additional data from a host is received. The processor may also automatically reduce the write speed of the optical disc apparatus upon a pause condition, thereby preventing the necessity for excessive pausing.

3 Claims, 9 Drawing Sheets

U.S. PATENT DOCUMENTS

| | | |
|---|---|---|
| 5,453,967 A | 9/1995 | Aramaki et al. |
| 5,457,672 A | 10/1995 | Shinada et al. |
| 5,463,607 A * | 10/1995 | Roth et al. ............... 369/47.33 |
| 5,471,450 A | 11/1995 | Yonemitsu et al. |
| 5,487,047 A | 1/1996 | Oka |
| 5,502,695 A | 3/1996 | Miura et al. |
| 5,504,728 A | 4/1996 | Yokota et al. |
| 5,517,477 A | 5/1996 | Sako |
| 5,519,680 A | 5/1996 | Honda |
| 5,526,333 A | 6/1996 | Usui et al. |
| 5,526,339 A | 6/1996 | Shimada |
| 5,541,901 A | 7/1996 | Okamoto et al. |
| 5,553,042 A | 9/1996 | Usui |
| 5,559,765 A | 9/1996 | Andou |
| 5,586,093 A | 12/1996 | Honda et al. |
| 5,590,101 A | 12/1996 | Itoi |
| 5,602,812 A | 2/1997 | Miura et al. |
| 5,604,646 A | 2/1997 | Yamawaki |
| 5,608,697 A | 3/1997 | De Haan et al. |
| 5,633,841 A | 5/1997 | Yokota et al. |
| 5,668,789 A | 9/1997 | Yokota et al. |
| 5,680,379 A | 10/1997 | Ishida et al. |
| 5,694,383 A | 12/1997 | Arataki et al. |
| 5,699,333 A | 12/1997 | Tsutsui |
| 5,740,143 A | 4/1998 | Suetomi |
| 5,740,144 A | 4/1998 | Kimura et al. |
| 5,745,445 A | 4/1998 | Yasukohchi et al. |
| 5,748,588 A | 5/1998 | Maeda et al. |
| 5,761,173 A | 6/1998 | Inoue |
| 5,793,739 A | 8/1998 | Tanaka et al. |
| 5,805,546 A | 9/1998 | Ando |
| 5,808,989 A | 9/1998 | Ueki et al. |
| 5,808,995 A | 9/1998 | Nakamura et al. |
| 5,812,502 A | 9/1998 | Hirai et al. |
| 5,815,472 A | 9/1998 | Kuroda et al. |
| 5,835,461 A | 11/1998 | Kobayashi et al. |
| 5,848,038 A | 12/1998 | Igarashi |
| 5,883,865 A | 3/1999 | Kondo et al. |
| 5,999,505 A | 12/1999 | Yasui |

\* cited by examiner

OPTICAL DISC APPARATUS

This application is a continuation of application Ser. No. 10/082,345; filed Feb. 26, 2002 which is a continuation of application Ser. No. 09/741,900 filed Dec. 22, 2000 (now U.S. Pat. No. 6,418,099); which is a continuation of application Ser. No. 08/906,290 filed Aug. 5, 1997 (now U.S. Pat. No. 6,198,707). Each of the above listed applications are herein incorporated by reference.

BACKGROUND OF THE INVENTION

1. Field of the Invention

The present invention relates to an optical disc drive which records and reproduces information for an optical disc like a CD-R media or a CD-RW media.

2. Description of the Related Art

The recording format of a CD-R or CD-RW optical disc is prescribed in the Orange Book, an industry standard. The Orange Book rules dictate that data sectors which are not consecutively written require lengthy lead-in and lead-out sectors such as Link, Run-In, and Run-Out sectors. These sectors are necessary to enable optical disc drives to synchronize to the data on the optical media. This is because the laser beam must be repositioned each time a new writing session is started, and known optical disc drive positional controls are not sufficiently accurate to position a laser beam at the exact end point of previously written data.

Therefore, conventional optical disc drives need to write data on an entire track, known as Track-at-Once, or an entire disc, known as Disc-at-Once, continuously in order to avoid adding lead-in and lead-out sectors. In other words, known optical disc drives must write the entire disc or track in a single writing session.

Conventional optical disc drives employ Cross-Interleaved Reed-Solomon Code (CIRC) encoding which is performed by a CD encoder chip. The CD encoder chip automatically encodes the data in a buffer which temporarily stores data from a host while waiting for the data to be encoded and written to an optical media. Another reason that conventional optical disc drives must write data in a single session is that the CD encoder chip will continue to generate dummy data even if the buffer containing data from the host becomes empty. Continuity of data, or data succession, is lost by inserting and writing dummy data in a head where data from a preceding sector was recorded.

Because conventional disc drives need to write an entire track or disc in a single session, a problem is encountered if the flow of data from the host computer to the optical disc drive buffer is interrupted. Since CD-R and CD-RW optical discs are write-once media, a write failure results in the loss of expensive media.

The problem of maintaining data from the host in the optical disc drive buffer is severe when the writing speed of the optical disc drive is high. Because the data size of a track or disc is large compared to the optical disc buffer size, if the data transfer rate between the host computer and the optical drive is even slightly slower than the speed at which data is written to the optical disc, or data transfer between the host and the optical disc drive is interrupted for even a short period, the buffer may go empty. This problem is known as Buffer Run.

Because hosts transmit data at varying rates, some optical disc drives include a test mode that performs a dummy write operation, during which no data is actually written to the optical disc, to ensure that the transmission rate of the host is adequate to prevent buffer run. One problem with this method is that it takes twice as long to write the data to the disc. Also, because hosts sometimes encounter non-repeatable problems, the aforementioned method is not perfectly safe and the risk of losing expensive media due to buffer run errors is not completely eliminated.

Therefore, an optical disc drive that can write data consecutively and normally to an optical media in multiple sessions without the loss of data succession is needed.

Even if logical data succession is ensured as described above, data cannot be normally reproduced without physical correspondence of the succeeding portions of data written in multiple sessions.

Usually, a frame gap of up to +/−2 bits may be present without preventing a conventional optical disc drive from properly reproducing data from an optical disc. However, if a conventional optical disc drive attempts to write multiple sessions of data by selecting a writing start point based on a rotating control by a wobble synchronic signal, a frame gap of scores of bits may result. Therefore, synchronization may be off in that portion and several frames of data may be lost.

Therefore, what is needed is an optical disc drive that is able to correctly detect an end portion of data written in a preceding write session so that an accurate write start point is provided for a succeeding write session.

Further, it is desirable that such an optical disc drive should be able to detect the end portion of data written in a preceding write session at low cost.

SUMMARY OF INVENTION

An object of the present invention is to provide an optical disc apparatus characterized by writing means for maintaining data succession by halting CIRC encoding at the end of a preceding write session and resuming CIRC encoding at the beginning of a succeeding write session.

A second object of the present invention is to provide an optical disc apparatus characterized by a counter circuit for counting the channel bit PLL (phase locked loop) which takes timing from the end of previously written data to select a writing start point for a succeeding write session.

A third object of the present invention is to provide a counter circuit for counting a frame sync signal which takes timing from the end of previously written data to select a writing start point for a succeeding write session.

A fourth object of the present invention is to provide controlling means for controlling the writing of data to an optical disc drive according to the present invention. The controlling means pauses a write operation when data from the host has not been transmitted in time for writing to the optical disc, and restarts the write operation when data from the host computer is again available.

A fifth object of the present invention is to provide an alternate controlling means for controlling the writing of data to an optical disc drive according to the present invention. The alternate controlling means pauses a data write operation when data from the host has not been transmitted in time for writing data to the optical disc, reduces the write speed of the optical disc drive, and then resumes the write operation.

In accordance with the first object, the optical disc drive includes a Pause circuit which masks the clock input to the encoders upon the generation of a Pause signal. This prevents the encoders from further inputting and outputting data. Therefore, even if writing to the optical disc occurs in multiple write sessions, data succession is maintained.

In accordance with the second object, one embodiment of an optical disc drive according to the present invention includes a counting circuit which counts the PLL signal derived from the channel bit. The PLL signal has the smallest error for previously written data. It is possible to calculate the end of the data based on this signal, so that the correct writing start point for succeeding data write sessions may be selected.

Many inexpensive and widely used decoder LSIs which are used in known optical disc drives do not output a channel bit PLL, but rather output a frame sync signal and a sub code sync signal as a sub code output. Therefore, in accordance with the third object, a second embodiment of an optical disc drive according to the present invention includes a counting circuit which counts a frame sync signal and a sub-code sync signal to select a writing start point for a succeeding data write session. Accordingly, it is possible to detect the end of the previously written data at low cost.

In accordance with the fourth object, one embodiment of an optical disc drive includes a processor for detecting when data from a host stored in a data buffer is low, generating a pause signal for pausing a data writing operation, waiting until additional data is received from the host, and removing the pause signal so that the data writing operation may resume.

In accordance with the fifth object, another embodiment of an optical disc drive includes a processor for detecting when data from a host stored in a data buffer is low, generating a pause signal for pausing a data writing operation, decreasing the write speed of the optical disc drive, and removing the pause signal so that the data writing operation may resume.

Because an optical disc drive according to the present invention can write in multiple sessions, a data interruption between the host and the optical disc drive does not result in the loss of the media, thereby reducing the cost of operating the optical disc drive. Accordingly, a large data buffer is not necessary, which also lowers the cost of the optical disc drive. This ability to write in multiple sessions also eliminates the need for a test write operation to test the transmission rate of the host computer, which saves time. It is also unnecessary for a user to be aware of the transmission rate of the host and the write rate of the optical disc drive, which simplifies operation of the optical disc drive.

DETAILED DESCRIPTION OF PREFERRED EMBODIMENTS

Preferred embodiments of the present invention will be described with reference to the accompanying drawings.

Figure 1:
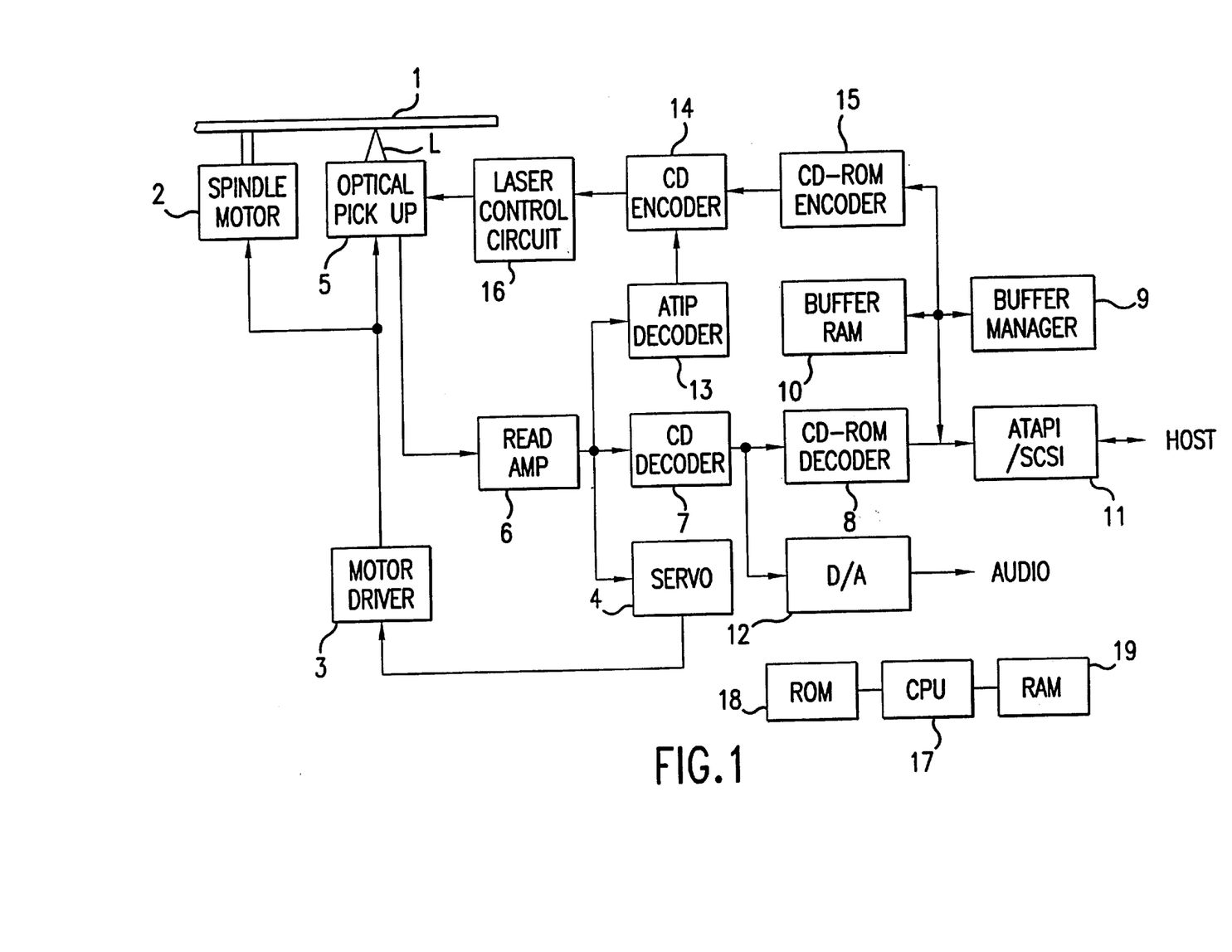
FIG. 1 is a hardware block diagram showing the structure of an optical disc apparatus in accordance with one embodiment of the present invention.

FIG. 1 is a hardware block diagram showing the structure of an optical disc apparatus according to one embodiment of the present invention. The optical disc 1 is turned by the spindle motor 2. The spindle motor 2 is controlled so as to keep constant linear velocity by the motor driver 3 and the servo 4. The linear velocity can be changed stepwise. The optical pick-up 5 includes a semi-conductor laser, an optical arrangement, a focus actuator, a photo detector, and a position sensor. The optical pick-up radiates laser rays L on the recording surface of the optical disc 1.

The optical pick-up 5 can be moved in a seeking direction. The focus actuator, track actuator, and seek motor are controlled to locate and focus the laser beam L on a target point of the optical disc 1 by the motor driver 3 and the servo 4 based on signals from the photo detector and position sensor of the optical pick-up 5.

When reproducing data, a reproducing signal obtained from the optical pick-up 5 is amplified and digitized by the read amplifier 6 and input to the CD decoder 7, where de-interleave and error correction are carried out.

When the reproduced data is audio or music data, an analog audio signal is derived by inputting the output data from the CD decoder 7 into the D/A converter 12.

When the reproduced data is ROM data, the de-interleaved and error-corrected data from the CD decoder 7 is input to the CD-ROM decoder 8, and further error correction is carried out. After that, output data from the CD-ROM decoder 8 is stored in the buffer RAM 10 by the buffer manager 9. When a complete sector of data is ready, the data is transferred to the host computer by the ATAPI/SCSI interface 11.

When data is to be written to the optical medium 1, the laser beam must be positioned at the writing start point. The writing start point is searched by the wobble signal pressed beforehand in the form of meandering track. The wobble signal includes absolute time information called ATIP. The ATIP information is derived by the ATIP decoder 13. A synchronizing signal produced by the ATIP decoder 13 is input to the CD encoder 14, and it is possible to write data at an accurate position.

Data that is to be written to the optical disc 1 is received from the host computer through the ATAPI/SCSI interface 11. The data is stored in the buffer RAM 10 by the buffer manager 9.

Data writing begins once data is present in the buffer RAM 10. Error correction codes are added to the data, and CIRC encoding is performed, by the CD-ROM encoder 15 and/or the CD encoder 14. The data is recorded on the target optical disc 1 through the laser control circuit 16 and the optical pick-up device 5.

Figure 2:
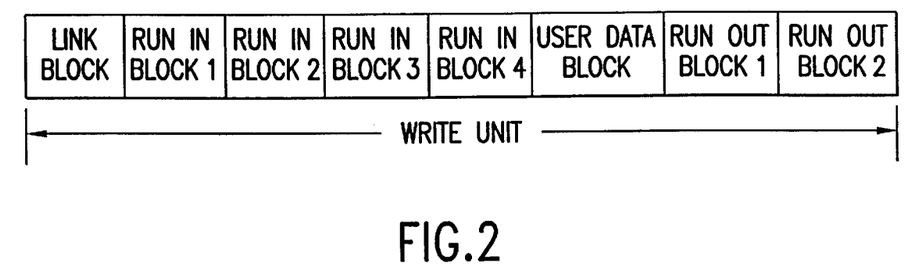
FIG. 2 is a format diagram showing the format of CD-R or CD-RW data on an optical disc.

Known optical disc drives cannot immediately begin reading User Data Blocks on an optical disc drive. In order for an optical disc drive to achieve synchronization and data interleave, lead in and lead out blocks are necessary. FIG. 2 shows a format that provides five lengthy lead in blocks comprising a link block and Run In Blocks 1–4 preceding the User Data Block, and two lengthy lead out blocks comprising Run Out Blocks 1 and 2 after the User Data block.

Figure 3:
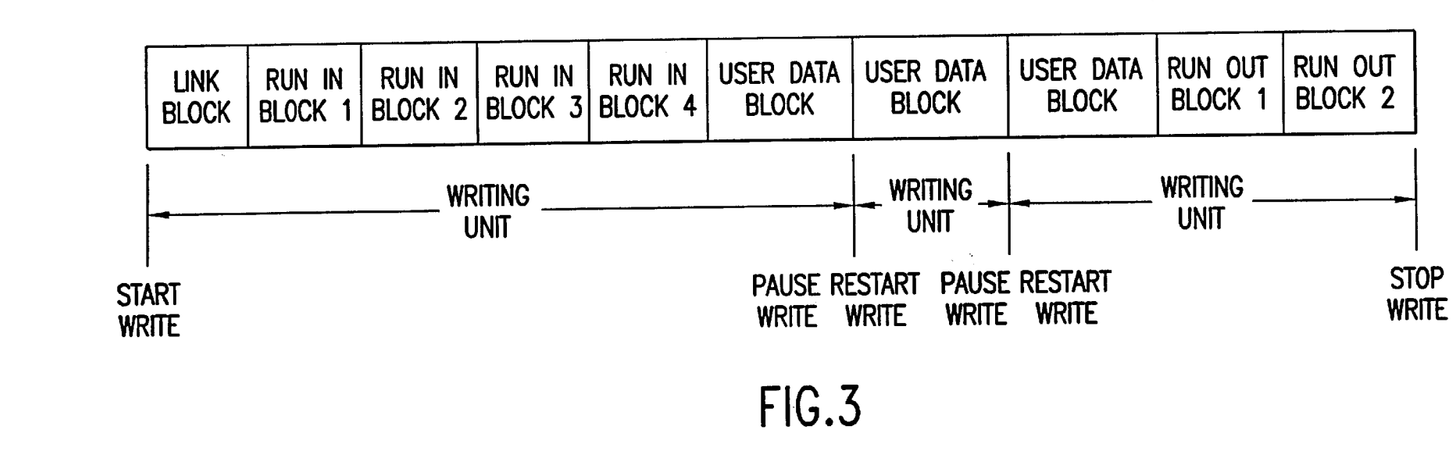
FIG. 3 is a timing diagram showing an example of a possible timing sequence of plural write sessions for writing data in the format shown in FIG. 2.

In order to prevent the aforementioned Buffer Run problem, the optical disc apparatus of the present invention is capable of writing user data in multiple write sessions. FIG. 3 illustrates an example of writing data in the format shown in FIG. 2 in multiple write sessions. The optical disc drive of the present invention receives data from the host computer, and carries out Start Write when the buffer RAM 10 is full of data. Start Write includes writing the lead-in and run-in blocks shown in FIG. 2.

When the optical disc drive starts to write the User Data Block, the data remaining in the buffer RAM 10 is reduced. If the amount of data in the buffer RAM 10 is below a preset level, a Pause signal is generated and the writing stops. The optical disc drive then waits for additional data transmission from the host. When the buffer RAM 10 is again full, Restart Write is carried out by removing the Pause signal and data is written from the position at which the writing was paused. When all data from the host computer is written to the optical disc 1, the Stop Write point is reached.

A conventional optical disc drive cannot write data in the aforementioned manner for two reasons. First, a conventional disc drive does not provide a mechanism for stopping the CD-ROM encoder 15 and CD encoder 14 (FIG. 1) when no data is present in the buffer RAM 10. Thus, when no data is present in the buffer RAM 10, the encoders continue to write data, which changes the data format unit actually written on the optical disc 1 from the logical data format received from the host.

The logical data format unit must conform, as prescribed by the Orange Book, to the physical data format unit on the optical disc. If the encoder could be made to stop when data is not present in the buffer RAM 10, it would be easy to ensure that the physical data format units on the optical disc 1 conform to the logical data format units from the host.

Figure 4:
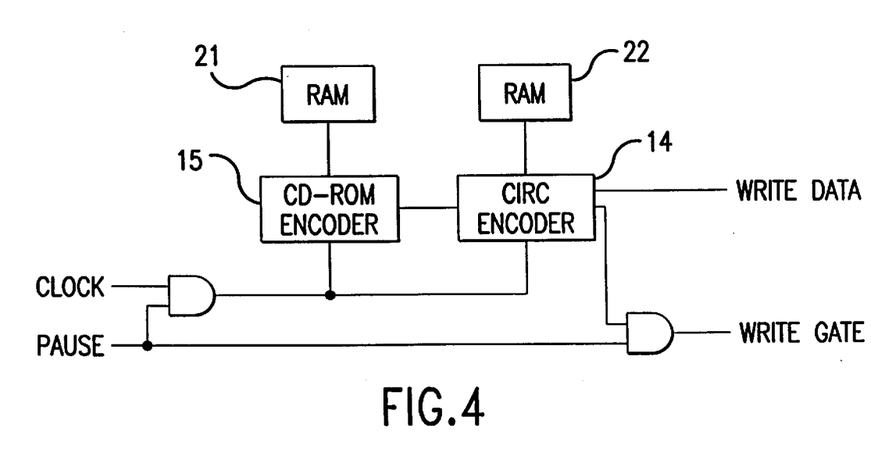
FIG. 4 is a circuit diagram of a write control circuit in the optical disc apparatus of FIG. 1.

FIG. 4 is a circuit diagram showing a circuit which controls data writing by pausing the encoders when a pause signal, indicating that the buffer RAM 10 is awaiting more data from the host, is received. When a Pause signal is input to the circuit, the clock to the CD-ROM encoder 15 and the CD encoder 14 is masked. Therefore, the CD-ROM encoder 15 and the CD encoder 14 stop encoding and stop outputting Write Data.

The Write Gate signal is also masked by the Pause signal. Therefore, data writing for the optical disc stops also. The encoding data in the RAM 21, 22 is maintained during the Pause. Then, when the Pause signal is canceled, writing on the optical disc resumes with data succession maintained. The pause signal is highly synchronized to the pausing and resuming of the data writing.

The second reason why a conventional optical disc drive cannot write data in the manner described in FIG. 3 is that the writing start point of the laser beam L cannot be controlled with sufficient accuracy using spindle motor controls based on the ATIP of the wobble signal.

Figure 5:
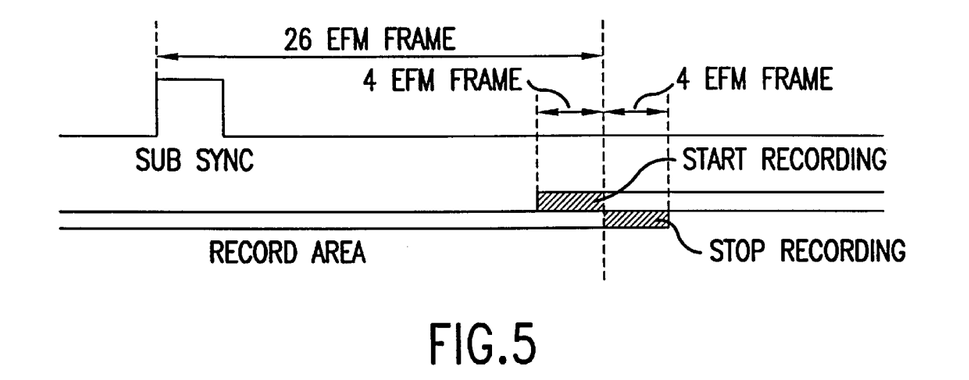
FIG. 5 is a format diagram showing the positional relationship of the end data written in a preceding write session and start data written in a succeeding write session by a conventional optical disc apparatus.

FIG. 5 is a format diagram showing the positional relationship of the end data written in a preceding write session and start data written in a succeeding write session by a conventional optical disc apparatus. As shown in FIG. 5, a large data overlapping of 4 EFM (eight to fourteen modulation) frames is possible with a conventional disc drive. Such a large error can occur due to spindle motor controller errors. The starting position of the data writing in a conventional disc drive is selected based on the ATIP of the wobble signal without reference to previously written data. When such a large error occurs, frame synchronization is out and it is impossible to reproduce data properly even for an optical disc such as a CD, which has high error correction capacity.

Figure 6:
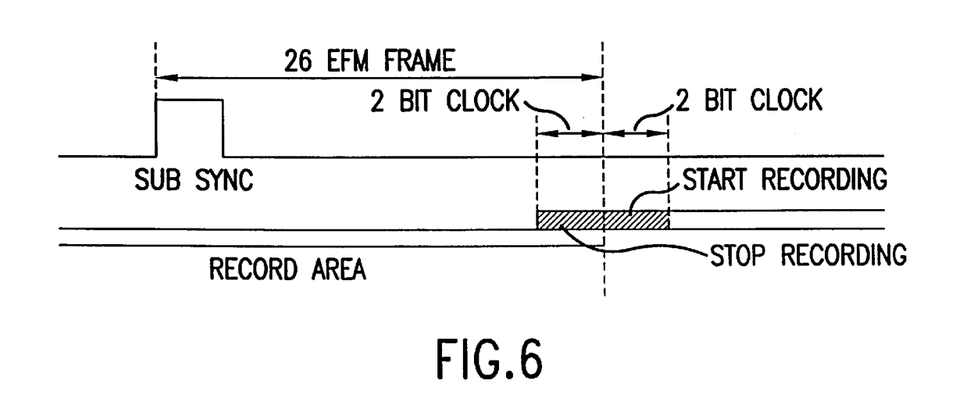
FIG. 6 is a format diagram showing the positional relationship of the end data written in a preceding write session and start data written in a succeeding write session by optical disc apparatus according to the present invention.

It is necessary, as shown in FIG. 6, to write succeeding data within a +/−2 bit clock error. Thus, it is impossible to accurately position the laser beam to the correct start location using a conventional optical disc drive with writing control based on the spindle motor control.

In contrast to known optical disc drives, the optical disc drive in accordance with the present invention locates the end of the data previously written. The end position is based on the clock used to synchronize written data. The data writing start position is then based on the end position.

Figure 7:
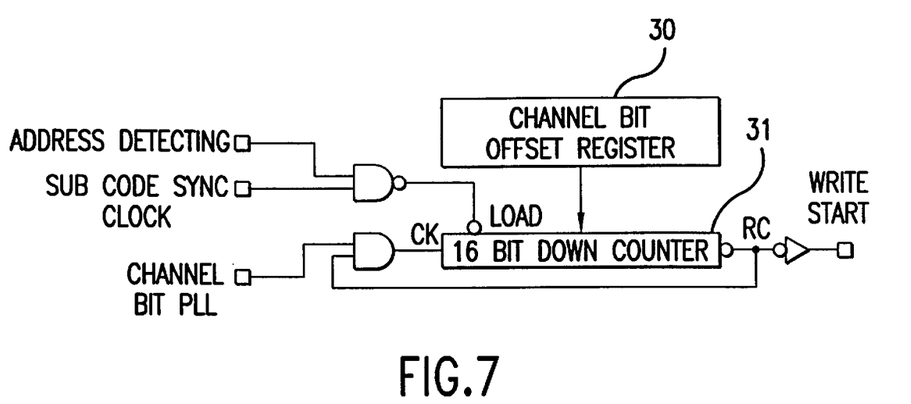
FIG. 7 is a circuit diagram showing a circuit for generating a write start signal at the end of previously written data, as shown in FIG. 6, according to one embodiment of the present invention.
Figure 8:
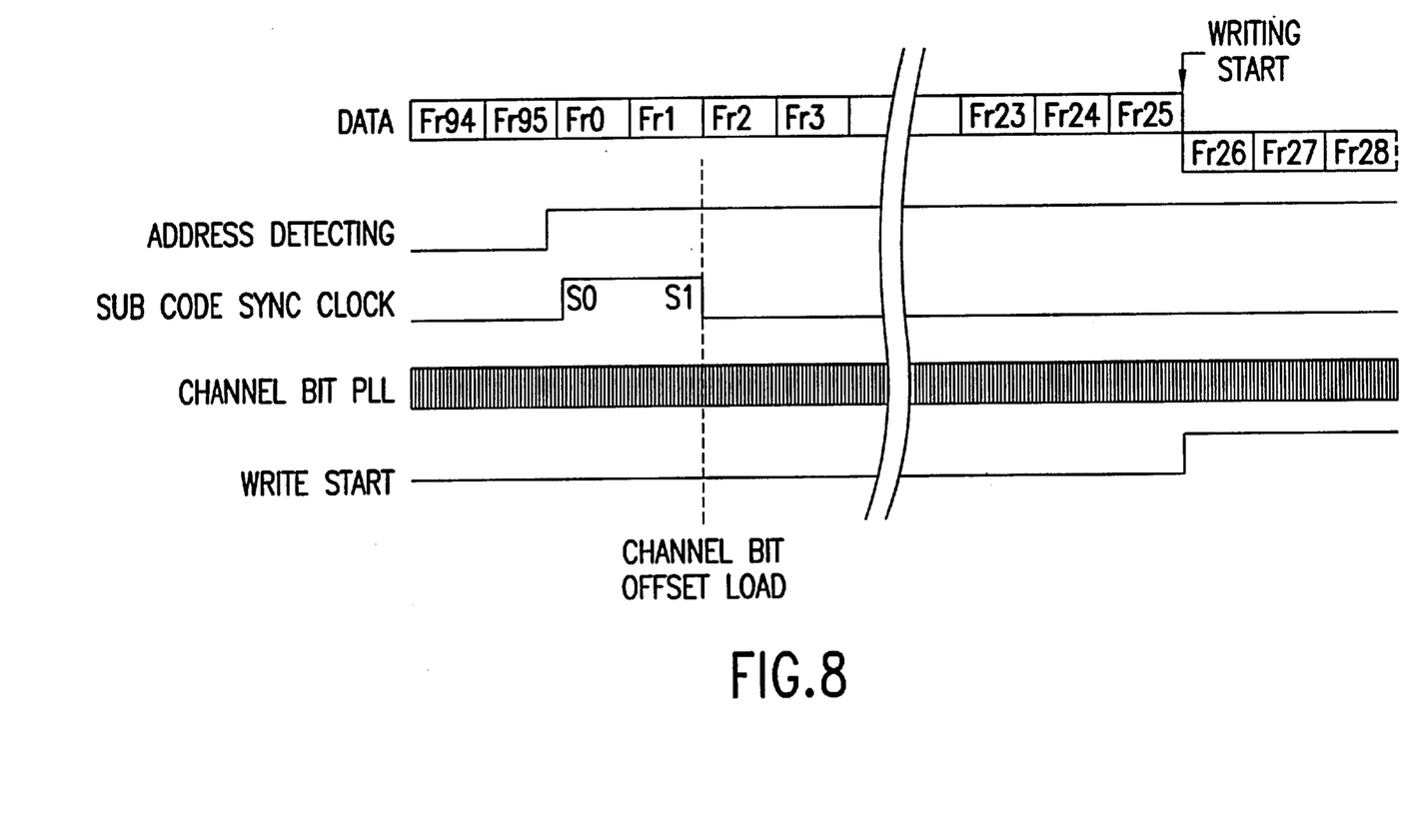
FIG. 8 is a timing diagram showing the write timing of an optical disc drive using the circuit of FIG. 7.

FIG. 7 is a circuit diagram illustrating a circuit for generating a write start signal at the end of previously written data (as shown in FIG. 6) according to one embodiment of the present invention. FIG. 8 is a timing diagram showing the write timing of an optical disc drive using the circuit of FIG. 7.

The circuit shown in FIG. 7 generates a write start signal by counting the channel bit PLL signal. The channel bit PLL clock number from the rising position of the sub code sync clock to the end position of data frame 25 is set in the channel bit offset register 30. This number is decided by sub sync clock producing timing (hardware) of the CD decoder. Therefore, the value of the channel bit offset register 30 cannot increase and decrease dynamically. The CD encoder reads the sub code of each frame and produces the sub code sync clock. However, decode delay is a little different because of variable CD decoder chips. Therefore, a gap between the data and the phase of the sub code sync clock is produced. The channel bit offset register 30 adjusts the gap. The apparatus detects the address of the writing start sector 1 by the ATIP or sub Q code, and loads the channel bit offset register 30 value to the 16 bit down counter 31 on the first sub code sync, which is the sub-code sync of the writing start sector. The down counter 31 then decrements on succeeding clock signals. Finally, when the 16 bit down counter 31 reaches zero, it outputs RC (Reset Counter), which is used as the Write Start signal.

Thus, it is possible to accurately start to write from the end of the data written during the preceding write operation. The write start signal for the succeeding portion of data with the smallest possible gap is formed by using the channel bit PLL, which is the signal with the smallest error.

Many inexpensive and widely used decoder LSIs used in conventional optical disc drives do not output a channel bit PLL signal. Rather, a frame sync signal and a sub code sync signal are output by these decoders. It is also possible to use these signals to accurately begin writing succeeding data at the end of previously written data.

Figure 9:
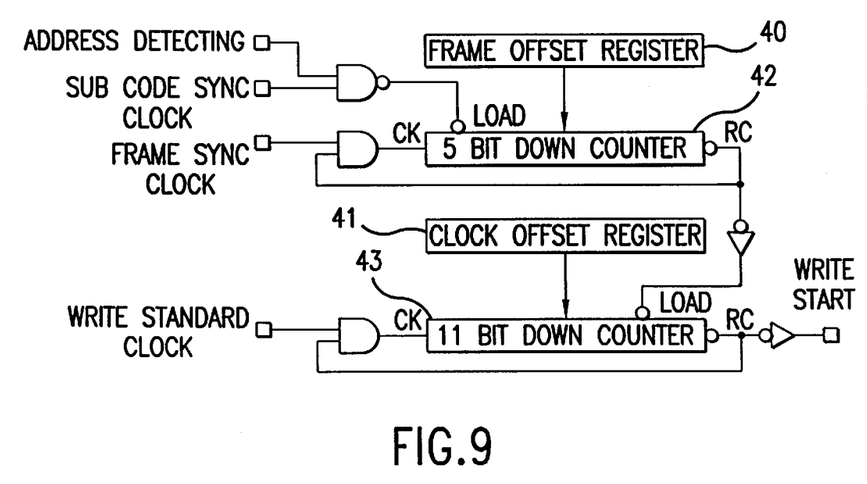
FIG. 9 is a circuit diagram showing a circuit for generating a write start signal at the end of previously written data, as shown in FIG. 6, according to a second embodiment of the present invention.
Figure 10:
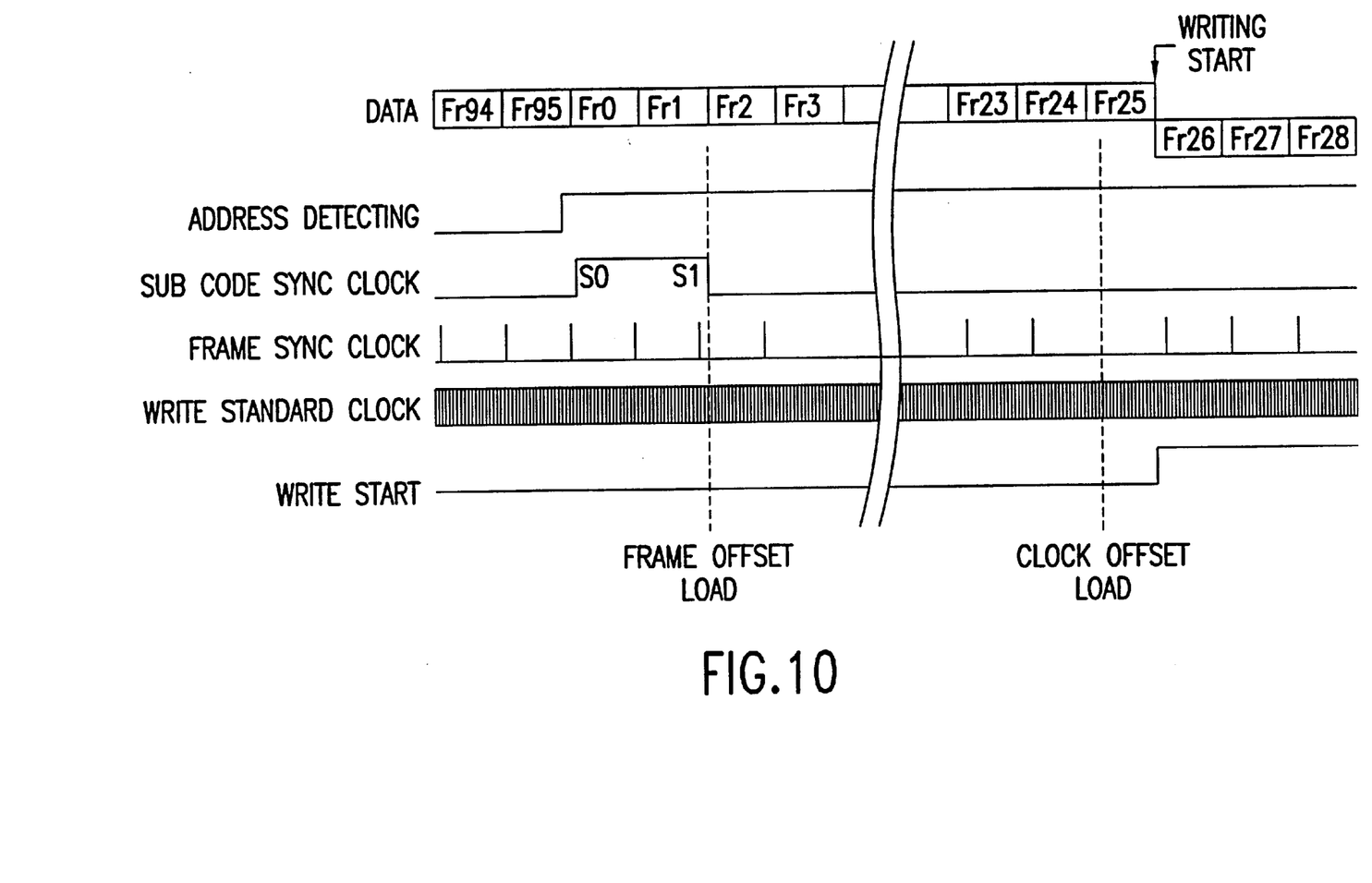
FIG. 10 is a timing diagram showing the write timing of an optical disc drive using the circuit of FIG. 9.

FIG. 9 is a circuit diagram showing a circuit for generating a write start signal based on the frame sync and sub code sync signals from the decoder 7 of the optical disc drive shown in FIG. 1. FIG. 10 is a timing diagram showing the relationship between the input frame sync and sub code sync signals and output write start signal obtained from the circuit shown in FIG. 9.

The circuit shown in FIG. 9 generates a start write signal by counting the frame sync clock. The frame offset register 40 inputs the frame sync clock number from the sub code sync clock to a Fr25 frame sync clock. The clock offset register 41 inputs the Write standard clock number from the Fr25 frame sync clock to the write start position.

Then, the address of the writing start sector 1 is detected by ATIP or sub code. The frame offset register value is loaded to the 5 bit down counter 42 by the first sync code, which is the sub code sync of the writing start sector. The channel bit offset register value is loaded to the 16 bit down counter 31.

When the 5 bit down counter 42 is decremented by the frame sync clock and becomes zero, it loads the value of the clock offset register 41 to the 11 bit down counter 43. When the 11 bit down counter 43 is decremented by the Writing standard clock and becomes zero, it outputs RC, which is the Write Start signal.

In this manner, it is possible to start to write accurately from the end of previously written data based on a count of the frame sync signal. The frame sync signal can be obtained by an inexpensive and widely used decoder LSI. Therefore, the cost of the optical disc drive can be reduced.

Figure 11:
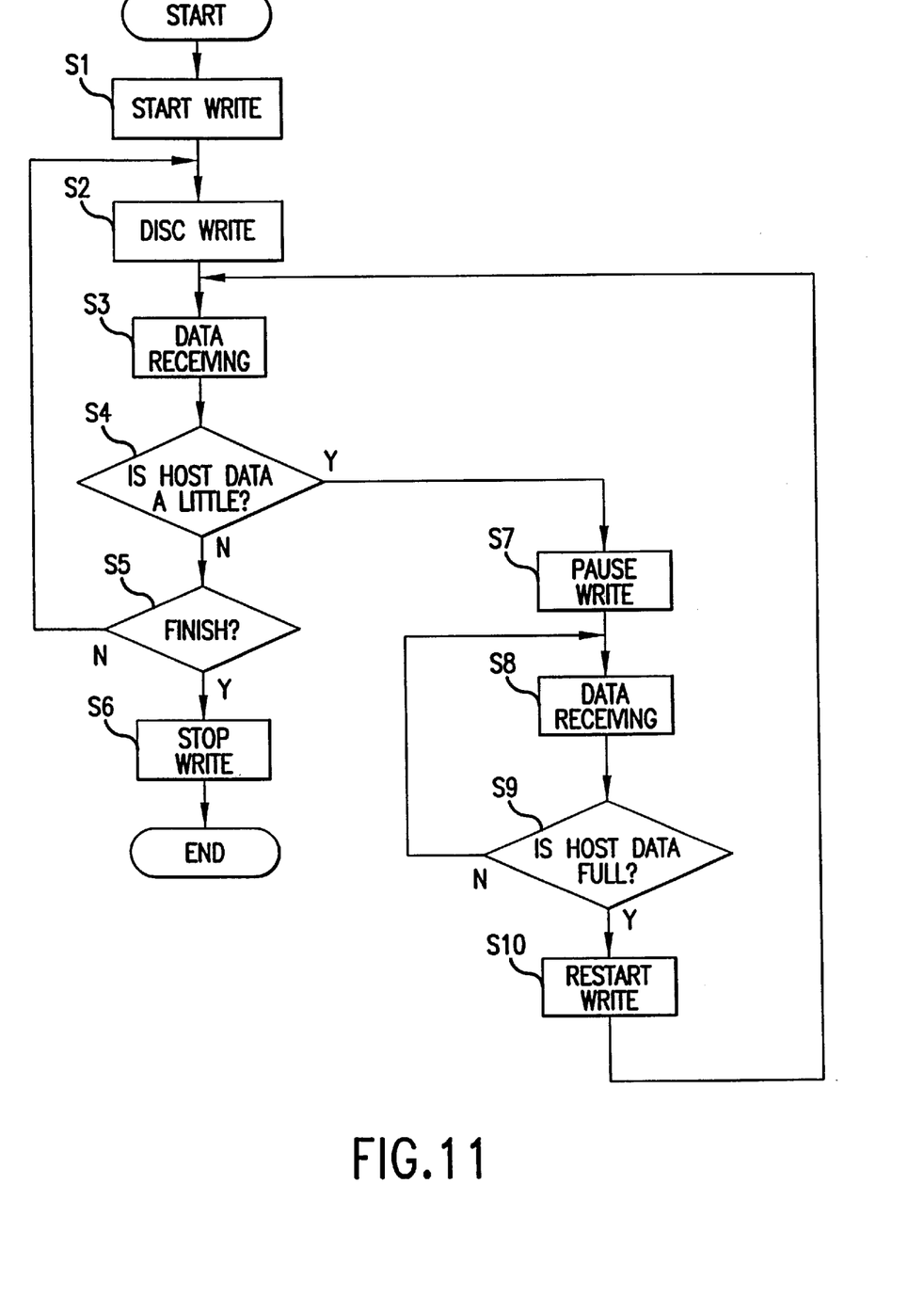
FIG. 11 is a flow chart showing one method for writing data to an optical disc using an optical disc drive according to the present invention.

The CPU 17, ROM 18 and RAM 19 (FIG. 1) are used to control write operations for the optical disc drive according to one of two methods. One such method is shown in FIG. 11. When writing is to start, the link block and four run-in blocks are written to the disc at step S1. User data in the buffer is written to the disc as step S2. This is the normal writing sequence which starts from the link and run-in blocks. Additional data is received from the host at step S3. At step S4, the amount of data in the buffer is determined to determine whether a buffer run error may be occurring.

If the data in the buffer from the host is not low in step S4, the buffer is checked to determine whether the data is complete at step S5. If data writing is not complete, the data writing continues at step S2. If the data writing is complete, Stop Write occurs at step S6, and the write operation is complete. Stop Write is normal sequence of writing the Run out blocks.

If the data from the host is low in the step S5, a Pause Write signal is generated to pause the write operation at step S7 while more data is received from the host at step S8, thereby preventing a buffer run condition. The content of the buffer is checked at step S9. If the buffer is not full at step S9, additional data is received at step S8. When the buffer is full, writing resumes at step S10 without writing any link blocks, thereby maintaining data succession. The writing operation continues at step S3.

In this manner, when the data transmission from the host is not in time during write operations to the optical disc, the data writing stops. When the data is fully sent from the host, the write operation resumes.

Accordingly, when the data transmission from the host is momentarily interrupted, or the transmission rate is reduced, it is possible to write data on the optical disc by dividing the write operation into a plurality of write operations. Data writing failures can thus be prevented. The size of the buffer RAM necessary for absorbing data transmission rate variations can therefore be reduced, thereby reducing the cost of the optical disc drive.

Figure 12:
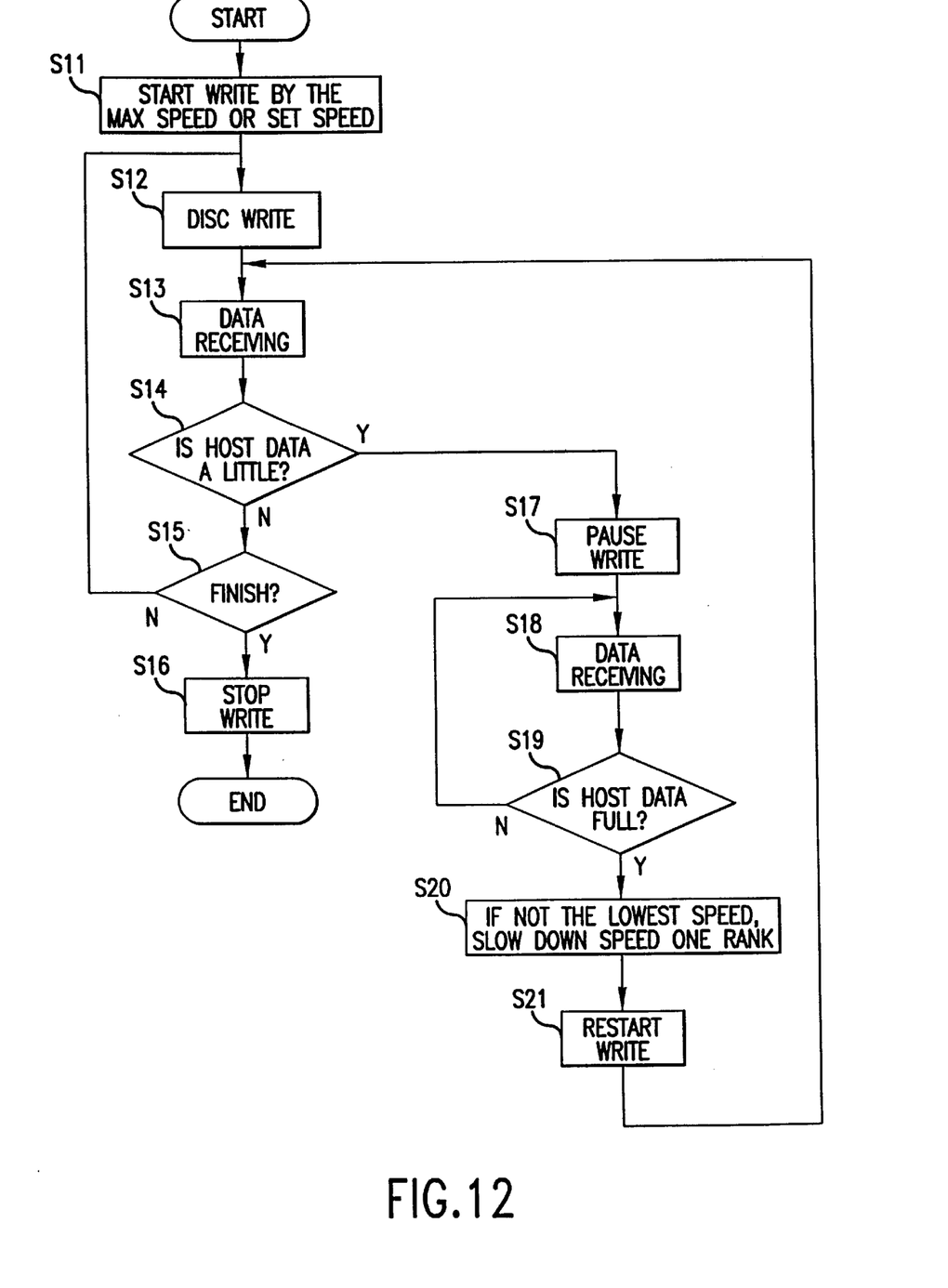
FIG. 12 is a flow chart showing a second method for writing data to an optical disc using an optical disc drive according to the present invention.

A second method for controlling the write operation of an optical disc drive according to the present invention is shown in FIG. 12. In this method, the Start Write operation is carried out at the speed set by the host, or at the maximum speed of the disc drive if no speed is specified by the host, at step S11. Data is written to the optical disc at step S12. Additional data is received from the host at step S13. The amount of data in the buffer is determined at step S14. The buffer may become depleted for the reasons discussed earlier.

If the data in the buffer from the host is not low at step 14, it is determined whether the data has completed at step S15. If the data has not completed, data writing continues at step S12. If the data has completed, Stop Write is carried out at step S16 and the writing operation is complete.

If the data from the host is low at step 14, a Pause Write is generated at step S17 so that writing on the optical disc pauses. Then, additional data from the host is received at step S18. When the buffer is full at step S19, the optical disc drive recording speed is lowered one step at step S20 if the speed is not already at the minimum. The pause signal is removed at step S21, and the write operation continues at step S13 without writing any link blocks and maintaining data succession.

In this manner, when the data transmission rate from the host is less than the data writing rate of the optical disc, the data writing stops, the writing rate of the optical disc is stepped down, and data writing resumes.

Accordingly, the optical disc drive continues writing data after automatically changing the data writing speed in response to the data transmission rate from the host. Therefore, it prevents excessively long data writing operations caused by repeated Pauses. Further, a user does not have to check the data transmission capacity of the host and the writing speed of the optical disc driver. Therefore, the write operation is simple, and it is possible to write the data at the maximum capacity of the host.

The entire disclosure of Japanese Patent Application No. 8-206705, filed Aug. 6, 1996, is expressly incorporated herein by reference.

The above description and drawings are only illustrative of preferred embodiments which can achieve and provide the objects, features and advantages of the present invention. It is not intended that the invention be limited to the embodiments shown and described in detail herein. Modifications coming within the spirit and scope of the following claims are to be considered part of the invention.

What is claimed as new and desired to be protected by Letters Patent of the United States is:

1. A method of recording on an optical disc recording media, said method comprising the steps of:
    transferring stored input information to an encoder;
    transferring encoded information to a record circuit;
    causing an input buffer to contain less than a threshold amount of said input information; and
    when said input buffer contains less than the threshold amount of said input information, pausing said transferring of said encoded information, to stop said record circuit at a first point on said optical disk recording media while maintaining said encoded information; and
    wherein said record circuit does not write any run-out blocks while paused.

2. A method of recording on an optical disc recording media, said method comprising the steps of:

transferring stored input information to an encoder;

transferring encoded information to a record circuit;

causing an input buffer to contain less than a threshold amount of said input information;

when said input buffer contains less than the threshold amount of said input information, pausing said transferring of said encoded information, to stop said record circuit at a first point on said optical disk recording media while maintaining said encoded information;

causing said input buffer to contain at least a second threshold amount of information; and resuming said step of transferring said encoded information to said record circuit, to thereby restart said record circuit while maintaining data succession across said first point on said optical disc recording media;

wherein said record circuit does not write any run-in blocks during said resuming.

3. The method of claim 2, wherein said record circuit does not write any run-out blocks during said pausing.

* * * * *